May 31, 1966  R. JÖTTEN  3,254,285
ELECTRICAL MACHINE
Filed Nov. 14, 1961  5 Sheets-Sheet 1
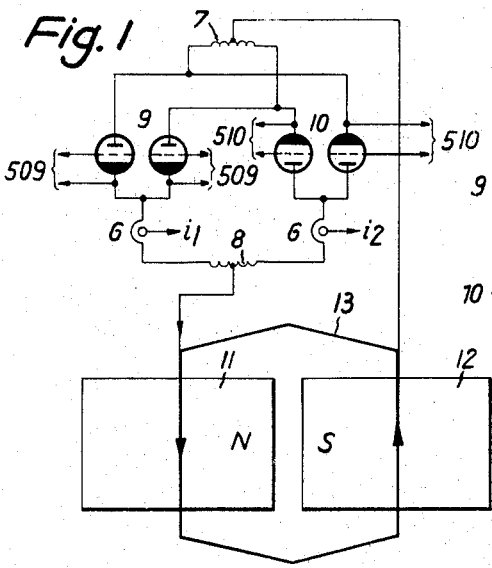
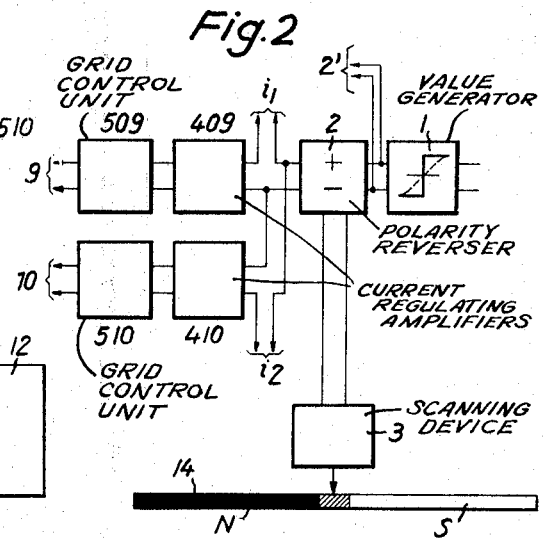
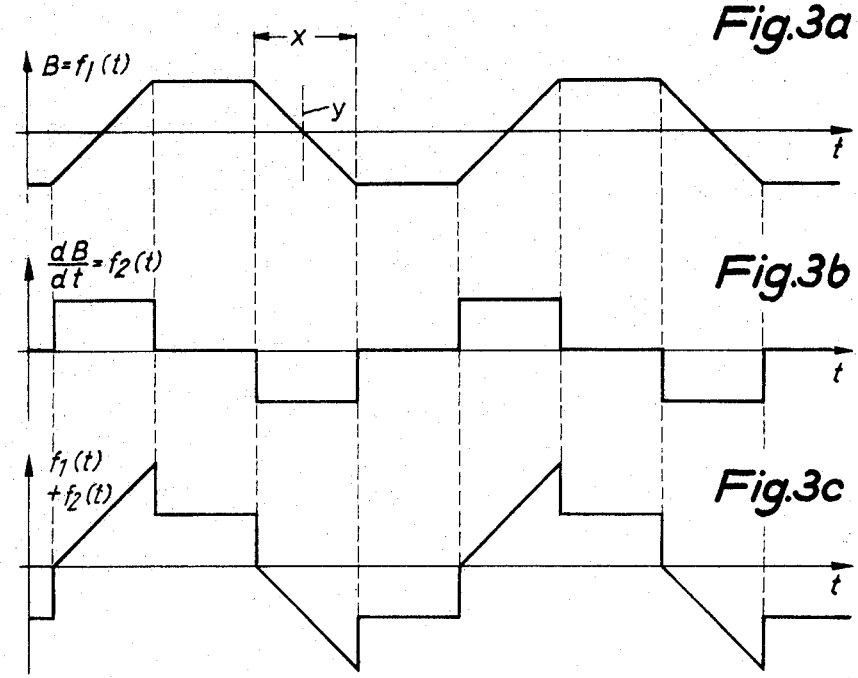
Robert Jötten
Inventor:
By: George A. Spencer
Attorney

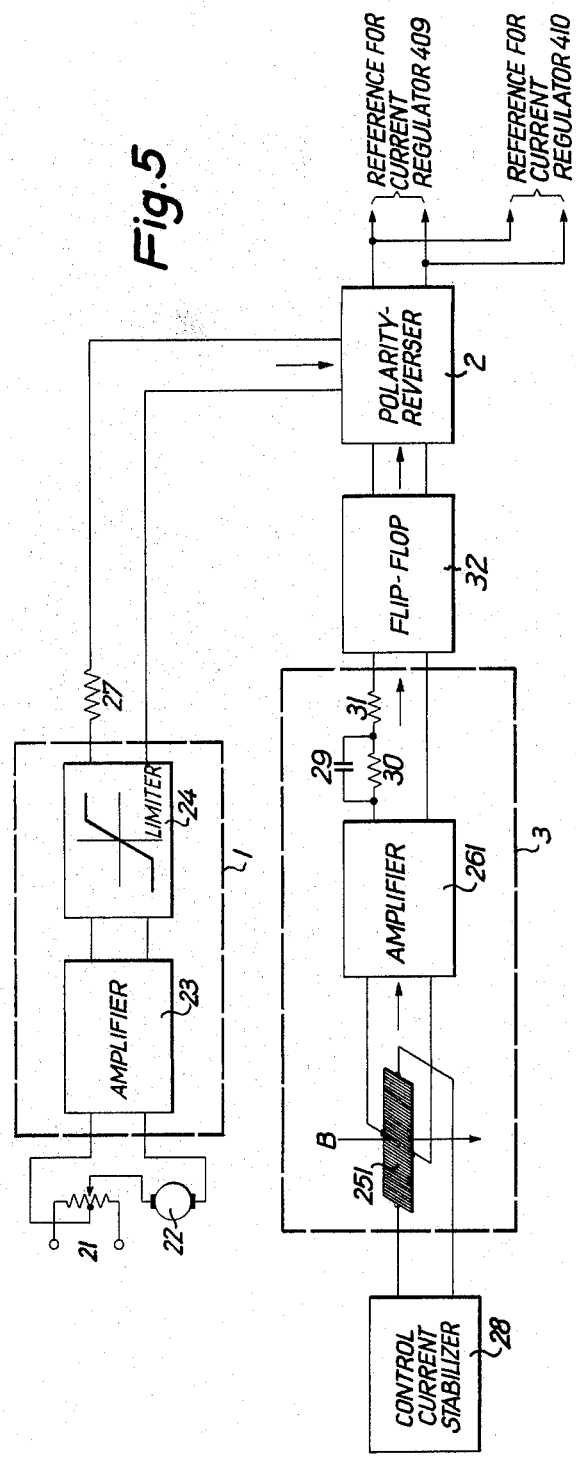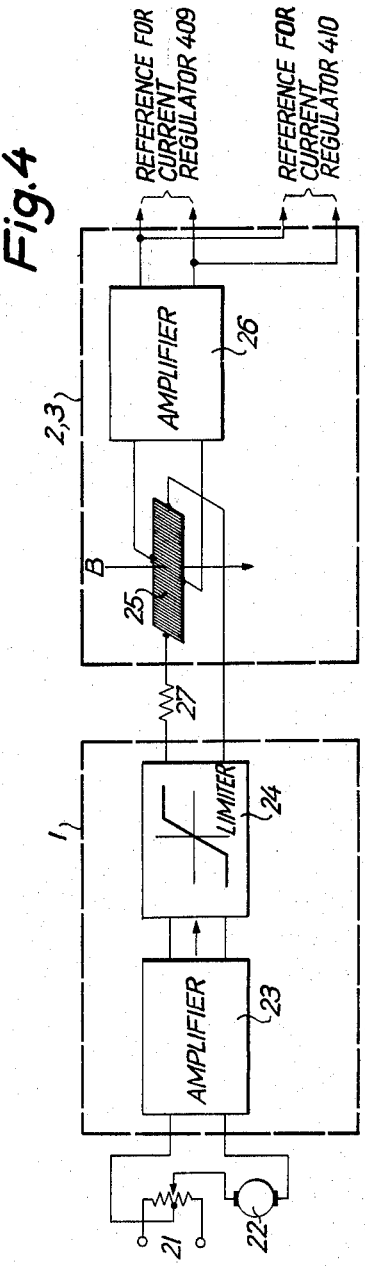

May 31, 1966  R. JÖTTEN  3,254,285
ELECTRICAL MACHINE

Filed Nov. 14, 1961  5 Sheets-Sheet 5

| | LIST OF PARTS |
|---|---|
| 650 | RESISTOR 56 kΩ 1/4 W |
| 613/633 | SI DIODES INTERMETALL OA 129 15 mA/20V |
| 620/640 | RESISTOR 1 kΩ 1/2 W |
| 626/646 | SI ZENER-DIODE INTERMETALL OA 126/12 15mA 12V 180 mW |
| 622/642 | TRANSFORMER 20V/40V 30mA/15 mA |
| 625/645 | SI DIODES OA 129 30mA 20V |
| 624/644 | TRANSISTOR (TELEFUNKEN) AC 106 30mA 20V |
| 648/649 | SI DIODE OA 129 (INTERMETALL) 30 mA/20V |

Robert Jötten
Inventor:

By: George H Spencer
Attorney

May 31, 1966  R. JÖTTEN  3,254,285
ELECTRICAL MACHINE
Filed Nov. 14, 1961  5 Sheets-Sheet 5

Inventor:
Robert Jötten
By: Spencer & Kaye
Attorneys

United States Patent Office 3,254,285
Patented May 31, 1966

3,254,285
ELECTRICAL MACHINE
Robert Jötten, Berlin-Frohnau, Germany, assignor to Licentia Patent-Verwaltungs-G.m.b.H., Frankfurt am Main, Germany
Filed Nov. 14, 1961, Ser. No. 152,248
Claims priority, application Germany, Nov. 14, 1960, L 37,525; July 11, 1961, L 39,529
13 Claims. (Cl. 318—138)

The present invention relates to an electric motor, combined with a static converter.

There exist such arrangements, i.e., rotating machines of the synchronous type which are fed by an A.C. input, having a D.C.-excited revolving field, these machines being fed by static A.C./A.C.-converters or A.C./D.C./A.C.-converters.

In converters having a D.C. intermediate circuit, the A.C.-line voltage is rectified and the rectified voltage is controlled. The D.C. voltage is then transformed by a further D.C./A.C. static converter, which acts as a so-called inverter, into an A.C. voltage having a frequency corresponding to that of the motor r.p.m. The machine delivers the commutating voltage and the reactive power output, but only upon rotation. In such an arrangement, the transition from motor operation to braking operation cannot be made completely continuous inasmuch as the rectifier, which is synchronized with the line voltage becomes an inverter and the inverter which is synchronized with the machine becomes a rectifier. In the course of this process, the polarity of the D.C. voltage is changed, whereas the direction of the direct current remains the same. The main disadvantages of such an arrangement, however, are the double conversion and the need for rectifier vessels connected therewith, as well as the fact that the machine is difficult to start because the machine, while it is at a stand-still, does not as yet deliver any commutating voltage.

There exists a converter arrangement having no D.C. intermediate circuit, which converter requires control means for the control of motor-input A.C. voltage, which arrangement likewise does not operate fully continuously. In fact, the last-mentioned type of arrangement produces the same difficulties upon starting and upon change of the direction of energy as does the arrangement incorporating a D.C. intermediate circuit.

It is, therefore, an object of the present invention to provide an arrangement which overcomes the above-mentioned drawbacks, and the basic concept underlying the present invention is that instead of an open-loop-control of the A.C. voltage, a special arrangement with feedback (i.e. closed loop-) control for the motor-current is provided. As will be more fully described below, it is this feature which allows the control and the automatic adaptation to the prevailing operating conditions to be carried out at all times. Furthermore, the machine is used with a higher efficiency than the before mentioned systems.

According to the present invention, each phase of a polyphase synchronous machine has current applied to it independently of the other phases by means of a static converter circuit, i.e., with valves in counter-parallel or cross-connection. The current through the converter is maintained by feedback-control at a predetermined value, and, upon change-over of the coil sides under the next pole, the algebraic sign of the desired or reference value for the current is changed. This produces ampere-turns of equal sign under each pole and a change-over of the algebraic sign of this current distribution, as in the case of a D.C. machine. The magnitude of the current reference value is given by a superimposed overall-feedback control, for example the output of a speed regulator, as described below.

Additional objects and advantages of the present invention will become apparent upon consideration of the following description when taken in conjunction with the accompanying drawings in which:

FIGURE 1 is a schematic circuit diagram of the present invention. Only the arrangement for one phase is shown.

FIGURE 2 is a block diagram showing a control circuit according to the present invention. In the case of a polyphae system block 1 is common to all phases, its output being branched in parallel to identical equipment (as 2') for the other phases.

Figure 6:
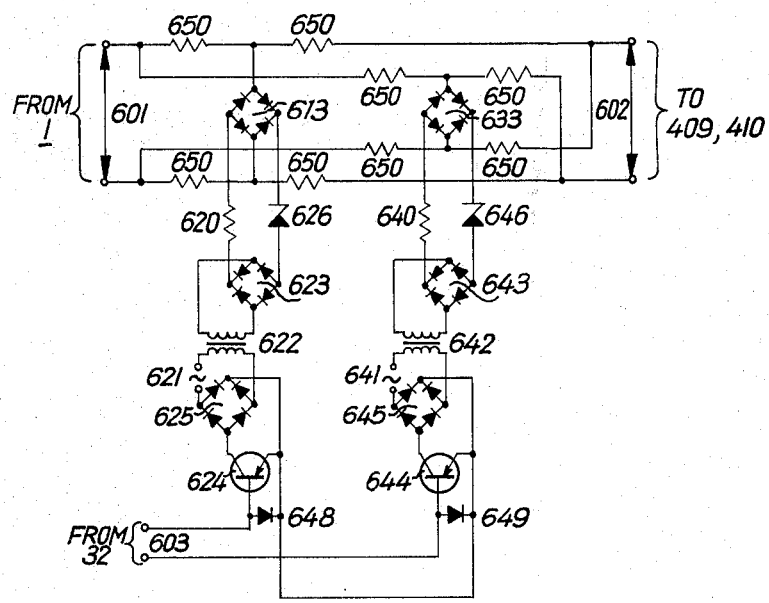

FIGURES 3a, 3b, and 3c are plots referring to the density of magnetic flux to which the coil-windings are exposed, and functions of time derived thereof.

FIGURES 4 to 11 show details.

In case the superimposed regulation is a voltage regulation, instead of a speed regulation, a phase-sensitive rectification of the actual A.C. voltage is necessary, with the output of the polarity reverser described below as phase reference.

Referring now to the drawings, FIGURE 1 is a circuit diagram of one phase of a polyphase machine; for the sake of simplicity, the static converter is shown as having two phases with mercury arc vessels or thyratrons. Of course, the arrangement can also be such as to incorporate controlled semiconductor rectifiers respectively converters. In this case, for instance, a three-phase bridge-connection is especially suitable. The counter-parallel circuit with current feedback control is well known in the art.[1][2] The rectifier of FIGURE 1 is in two phase center point connection and incorporates a tranformer secondary winding 7, choke means 8 for limiting the so-called circulating current, and two graups 9 and 10 of mercury arc vessels. These may be also thyratrons, or, as stated above, controlled semiconductor elements. The counter-parallel circuit can, if desired, be made to operate without the so-called circulating current, in which case the choke means 8 can be eliminated.[3]

Figure 8:
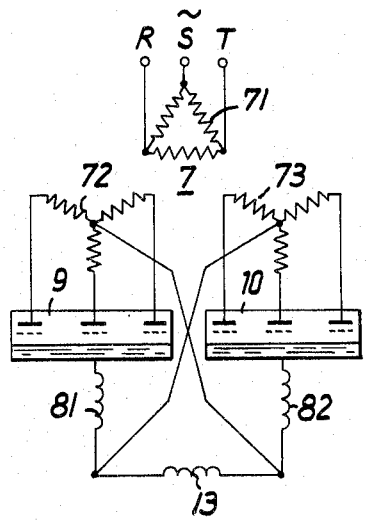
Figure 9:
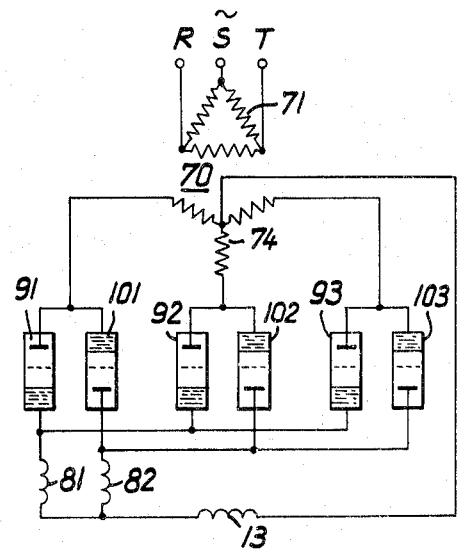

FIGURE 8 shows a typical cross circuit while FIGURE 9 shows a typical counter-parallel circuit.

In the circuit of FIGURE 8, the load, namely, the coil 13, is energized from a three-phase current mains RST via a current rectifier and its associated transformer 7. The transformer 7 has a primary winding 71 as well as two secondary windings 72 and 73. The secondary winding 72, a multiple-anode rectifier vessel 9 and a choke 81 form one rectifier component which supplies current to the load 13 in one direction. Current in the other direction is supplied to the load 13 via a second rectifier component, the same being constituted by the secondary winding 73, a multiple-anode rectifier vessel 10 and a choke 82.

In the counter-parallel circuit, according to FIGURE 9, the rectifier transformer 70 whose primary winding 71 is connected to the three-phase current mains RST has but ---
[1][2][3] See list of publications at end of specification.

one secondary winding 74. In lieu of the multiple-anode vessels 9 and 10 of the circuit of FIGURE 8, the circuit of FIGURE 9 is provided with a plurality of single-anode vessels 91, 92, 93; 101, 102, 103. Current which is fed to the load 13 is rectified, in one direction by the rectifier component constituted by vessels 91, 92, 93, and a choke 81, while the current in the opposite direction is rectified by the component which incorporates the vessels 101, 102, 103, and the choke 82.

In the following the superimposed feedback control is supposed to be a speed control with tachometer feedback. In a known arrangement for speed control of a D.C. motor, the amplified speed-error signal is limited and is applied, as current reference value, to a current regulator. This principle is also used here. In FIGURE 2, block 1 is part of superimposed control, for example a speed control, and gives as an output a limited reference value for the current regulation. This value can be positive or negative and is applied to the current regulators (409 and 410), but according to the invention not directly but via a polarity reverser 2. This polarity reverser 2 applies the output value of 1 to the current regulators 409 and 410 of the two rectifier groups 9 and 10 of the counter-parallel circuit. This is done either with the same or the opposite algebraic sign depending upon the signal coming from the scanning device 3. The control means for the valve groups 9 and 10 are shown at 509 and 510, and the actual currents through the groups, as measured by current transformers 6, are indicated at $i_1$ and $i_2$. The control means 509 and 510 allow the ignition angle of the valve groups 9 and 10 to be changed between rectifier operation and inverter operation. Such control means are shown, for example, in German Patent No. 971,050 and British Patent No. 909,847.

The purpose of each scanning device 3 associated with the respective phase is to determine under which pole (North pole N or South pole S, as the case may be), the coil side is located. The scanning device can be mounted in the inductor itself and can be made to respond to the polarity of the magnetic field to which the coil side is exposed. Such an arrangement has the advantage that a field distortion due to armature reaction is automatically taken into consideration, thereby improving the efficiency of the machine. FIGURE 1 also shows a development of the pole system or revolving fields 11, 12, together with a coil 13, i.e., the winding of one phase. FIGURE 2 also shows at 14 and, in development form, how the position of the revolving fields 11, 12 relative to coil 13 is sensed by the scanning device, the zone of North polarity being shown at N and the zone of South polarity at S, there being a transition zone in between. That which affects the scanning device 3 may be the magnetic flux density in the air gap at the place where the coil side, which is stationary relative to the stator, is located, or it can be a replica thereof, especially a reduced-size replica, as will be described below.

Figure 10:
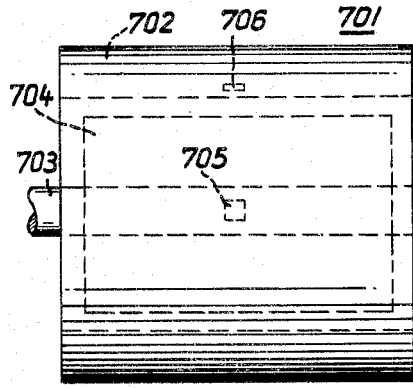
Figure 11:
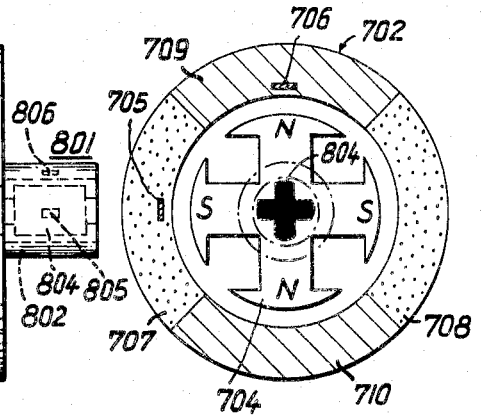

FIGURE 10 is a schematic illustration of a synchronous motor 701 equipped with a device 801 for producing the replica of the field, and FIGURE 11 is a sectional side elevation.

The synchronous motor 701 comprises a stator 702, a shaft 703 and a rotor 704. The stator carries an alternating current winding, that is to say, the stator is an inductor. In FIGURE 11, the cross-hatching and the dots are intended to show that the winding distribution is that of a two-phase machine. The sections 707 and 708 pertain to one phase winding while the sections 709 and 710 pertain to the other phase winding.

The rotor 701 has salient north and south poles, shown at N and S. While these poles are generally energized by means of a direct current winding (not shown), they may, alternatively, be constituted by permanent magnets.

The synchronous motor 701 is provided with the device 801 which is used for producing a replica of the revolving field produced by the pole star 704. The device 801 is provided with a stator 802 and a rotor 804, the latter being coupled to the shaft 703. The pole star may have a shape similar to that of the pole star 704, and is shown, in FIGURE 11, as a solid black cross. Inasmuch as a separate field replica producing device is provided, the pole system 804 of such separate device may have different pole gap dimensions than the pole system 704 of the synchronous motor itself. As shown in FIGURE 11, the poles of the pole system 704 have pole shoes while the poles of the pole system 804 do not. The gaps of the pole system 804, measured along the outer periphery, are thus proportionately greater than the gaps measured along the outer periphery of the pole system 704.

The field produced by the pole system 804 is picked by means of Hall-type transducers 805 and 806, which pertain to a respective phase winding 707, 708; 709, 710. If it is not necessary to take advantage of the separate device 801 that provides pole gaps of a size different from the pole gaps of the synchronous machine, the magnetic-field sensitive feelers can be arranged in the inductor 702 of the synchronous motor 701; this is shown by the Hall-type transducers indicated at 705 and 706.

In the following the procedure of current reversal in the coil is more closely considered.

The current reversal is determined by both the electromotive forces and the impedance of the current reversing circuit. The electromotive forces are the motive voltage and the converter output voltage.

When the machine operates as a motor, the electromotive force in the coil is opposed to the direction of the current, so long as the coil side, as, for example, a bar, has not yet entered the neutral zone, in other words it would support the commutation. The current-conducting valve group has to be controlled to act as an inverter, that is, to change the sign of its output voltage, at the start of the current reversal. If the coil side is already on the other side of the neutral zone, i.e., in the effective range of the subsequent pole, before the current has reached the desired value in the opposite direction, the subsequent commutation has to take place against the now reversed coil E.M.F.

During braking the converter group acts as an inverter, and the current has the same direction as the E.M.F. of the coil. The current reversal can start only when the inverter voltage can become larger than the coil E.M.F., i.e., when the coil E.M.F. in the pole gap has been reduced to values which are smaller than the maximum inverter voltage. It is therefore expedient to let the current reversal start upon entry into the pole gap.

The scanning device 3 of each phase can, for instance, be a Hall-type transducer. It is expedient to let the position of the polarity reverser 2 be dependent of the algebraic sign of the sum function $$f = K_1 \cdot B + K_2 \frac{dB}{dt}$$

where $K_1$ and $K_2$ are constants, $B$=magnetic flux density, and $t$=time. As shown in FIGURES 3a, 3b, and 3c, the change of algebraic sign for $f(t)$ can be made to occur at the start of the pole gap and by changing $K_2$ be delayed until the neutral zone Y. In FIGURE 3a, $B=f_1(t)$. In FIGURE 3b, $dB/dt=f_2(t)$ and it will be seen from FIGURE 3c, where the sum $f_1(t)+f_2(t)$ is plotted, that the zero cross overs have been shifted to the start of the pole gap X. It is well known how to obtain approximate realizations of the proportional-differential relationship described by $f(t)$ from the measured voltage which is proportional to the magnetic field.

In FIGURE 2 the control elements are all shown as blocks. The grid control units 509, 510, the current regulating amplifiers 409, 410 and the regulating amplifier with limited output, belonging to the superimposed regulation, for example speed regulation with tachometer feedback 1, are so well known and described in literature that, for the sake of simplicity, they can be shown as blocks. The essential parts, however, which are different from what is known, are incorporated in blocks 2 and 3 and their combination with the whole arrangement. For better understanding these parts are more precisely described in connection with FIGURE 4 and the following.

FIGURE 4 refers to the most simple case, where the polarity reverser 2 and the scanning device 3 are combined in one single Hall multiplier 25. 21 is the reference, 22 the tachometer for a superimposed speed control. Unit 1, corresponding to FIGURE 2 contains the regulating amplifier 23 for the speed control with limiter 24. The output voltage of 1 produces the control current for the Hall multiplier 25, by resistor 27. This control current corresponds to the amplified speed error signal and is one input-factor for the Hall multiplier. The other input-factor is the magnetic flux density B to which the coil side, and therewith the scanning device, is exposed. The output voltage of the multiplier has a magnitude of 0.5 v. and is amplified by amplifier 26, whose polarized output voltage is a suitable current reference value to be applied to current regulators 409 and 410 of the two valve-groups.

FIGURE 5 gives an example, where the current reference is changed in sign suddenly, and not altered continuously, as in the example of FIGURE 4. Functions of 21, 22 and 1 are the same as in the example described before. The scanning device 3 contains the Hall transducer 251, which is exposed to the magnetic flux density in the air gap, B. The control current of the Hall transducer is delivered by a current stabilizer 28. The output voltage is again amplified by amplifier 261 and acts upon a conventional flip-flop 32 by way of a proportional differential network, which is composed of resistor 30, capacitor 29 and resistor 31. The output of the flip-flop 32 acts upon the polarity reverser 2 in order to transmit the signal fed in by block 1 with the same or the opposite sign as the reference value to current regulators 409 and 410.

The polarity reverser used in FIGURE 5 is more closely described with respect to FIGURE 6. The input terminals are designated 601. They are connected to the output of 1, which is the signal to be reversed in polarity. The output terminals are designated 602. They are connected to the current regulators 409 and 410 as current reference value. The polarity reverser is actuated by the signal coming from the flip-flop 32 with changing polarity into terminals 603. A signal of either polarity switches on one of the two pnp junction-transistors 624 or 644 with diodes 648, 649 in their input circuits. The transistor, in turn, switches on a constant current device feeding rectifiers 613 respectively 633 into their D.C.-side. The rectifier in this case makes a short circuit between its A.C.-terminals. As can be easily seen, the "closing" of 613 produces a reversed polarity output, the "closing" of 633 produces an output of the same polarity. Because resistors 650 are all equal in magnitude, the signal is reduced in a 1:3 ratio. The constant current devices work as follows:

The transistors 624, 644 connect the transformers 622, 642 by way of the rectifier bridges 625, 645 alternatively to the A.C.-terminals 621, 641. The transformers give potential separation and make it possible to handle higher voltages than the transistors 624, 644 can do. Preferably the A.C.-source is one of rectangular waveshape. In this case smoothing of the constant current is not necessary. Rectifiers 623, 643 transform the switched A.C.-voltage again to D.C. Resistor 620, 640 define the value of the constant current fed into the D.C.-side of rectifiers 613, 633 respectively. Zener diodes 626, 646 prevent the rectifier which gets no constant current input on its D.C.-side from short circuiting, it produces (passive) blocking voltage for rectifiers 613, 633 respectively. Below the figure, there is given a list of the dimensions of the parts used in this arrangement.

Figure 7:
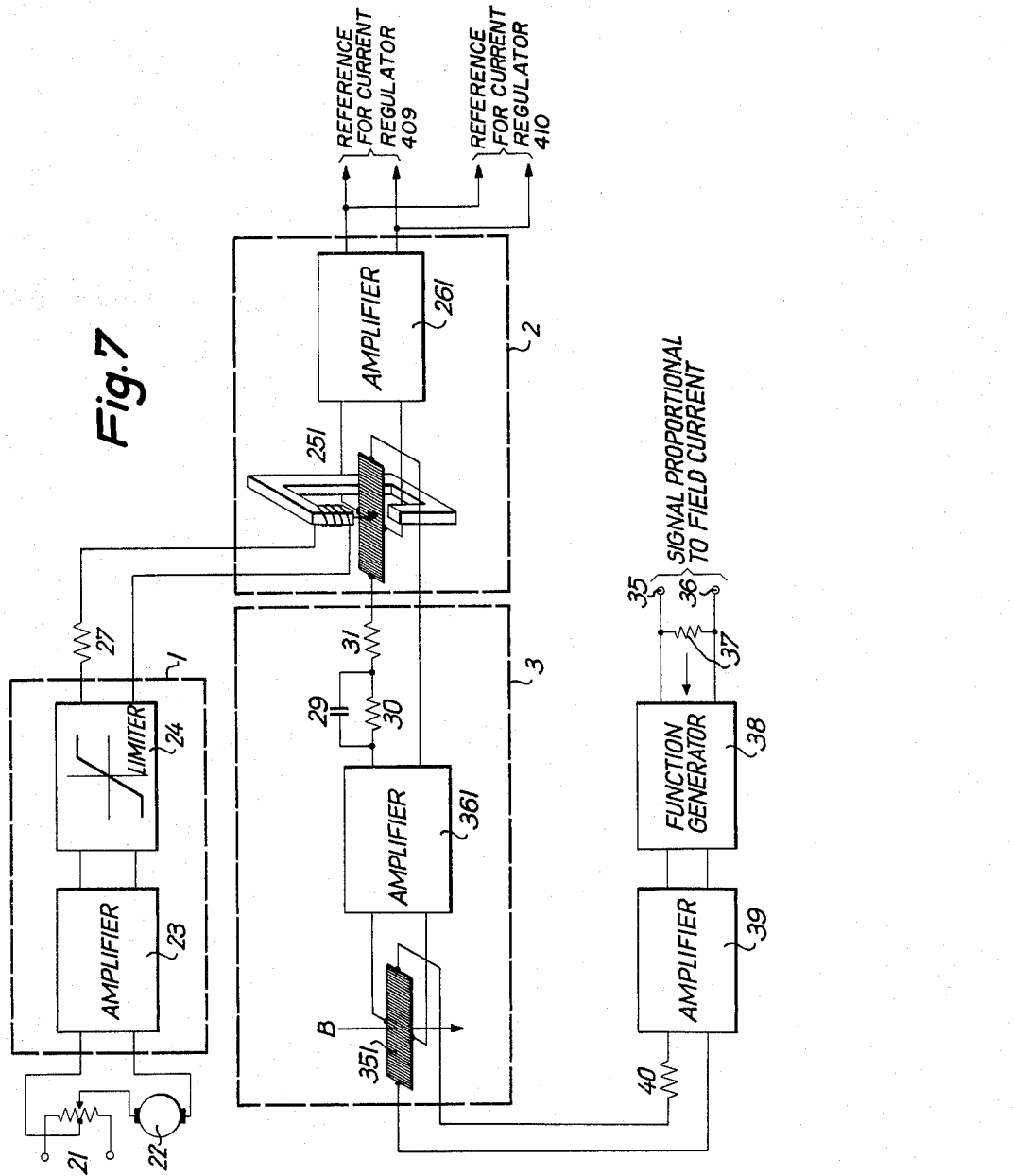

FIGURE 7 shows another arrangement, where the scanning device and the polarity reverser both are Hall transducers. In this example the reference value for the current is altered continuously. Furthermore, a special feature is provided to keep the output of the scanning device constant during field weakening. Items 1, 21, 22 and 27 are as described before. The Hall transducer 351 in the scanning device 3 is fed by a control current, which is dependent upon the field current of the machine. A constant current signal corresponding to the field current is fed into terminals 35, 36 to burden resistor 37, for example, by a current transformer. In order to get equal signals at the output of the scanning device, i.e., the Hall transducer 351, the control current of the Hall transducer must be inversely portional to the magnetic flux of the machine. This is accomplished by transforming the signal which corresponds to the strength of the field current by way of function generator 38, which is of the conventional form used in analog computers. The output of the function generator 38 is transformed into a constant current control input for the Hall transducer 351 by way of amplifier 39 and resistor 40. The function of signal amplifier 361 and proportional differential network 29, 30, 31 incorporated in block 3, is the same as in FIGURE 5, desicribed before. The continuous polarity reverser or modulator in this case is another Hall transducer, a Hall multiplier 251. Its control current is fed in as the one factor by the scanning device, the magnetic flux density, as the other input factor, is produced by a constant current input, which is delivered by the superimposed regulator, for instance the speed regulator like in the foregoing examples. The output voltage of 251 is again amplified and applied as a current reference value to current regulators 409 and 410.

In the following some modifications of the scanning device 3 will be described.

Instead of accommodating the scanning device 3 in the inductor, the position of the revolving field can be obtained electrically, magnetically or photo-electrically from a control collector, a revolving field system of reduced size, or raster disc. In small machines, it may become unnecessary to consider the starting of the commutation, and the required current value can be reversed whenever the coil enters a pole gap or a zone which is symmetrical with respect to the neutral zone of the revolving field.

In order to obtain a fixed correlation between the position of the polarity reverser 2 and the coil 13 and revolving field (poles 11, 12), it is expedient to connect a bistable flip-flop circuit ahead of the reverser, which circuit changes its state only upon the occurrence of a signal of particular polarity, which signal is derived from the change in the polarized measured value, for instance, the induction. If photo-electric means are used for determining the position of the revolving field, it is advantageous to use a three-value raster, the three values being the N pole, the S pole, and the pole gap. This three-value raster can be black-gray-white, as shown in FIGURE 2 at 14, or color-black-color, and be used in conjunction with color-sensitive photocells in the scanning device 3.

The above-described invention can also be used in operations involving weakening of the field, with all known methods for this type of operation being applicable, because the drive has the operating characteristics of a reverse drive with a D.C. motor which is fed via mercury arc converters in counter-parallel connection. Especially applicable is an arrangement well known in the art of continuous and reversing drives, comprising a combination of speed control via the armature voltage and fieldweakening via armature voltage limiting by the motor field control. (Appendix[1] pages 77, 79.) In this case the rectified armature voltage is to be used as actual value.

---

[1] See list of publications at end of specification.

If the sensing device is a Hall-type transducer mounted in the inductor, the level of the output voltage can be adapted to the changing field by changing the control current of the Hall transducer in such a manner that the output voltage of the Hall transducer, upon weakening of the field, remains approximately constant in the range of the highest induction, as described before.

For the above-described arrangement it is particularly advantageous if the frequency of the machine is smaller than the A.C. line frequency, i.e., if the machine has a rotor having a small number of poles and running below synchronous speed respective to line frequency.

The time throughout which the current is reversed cannot fall below a certain minimum value, because upon the reversing in the inverter range, the controlled voltage is identical to the phase voltage of the anode which at the moment is conducting, so that an average time interval of 10 milliseconds is necessary for the change-over from maximum positive to maximum negative converter voltage.

The number of phases can be made equal to or smaller than the number of slots per pole. The phases may overlap. For purposes of matching to the voltage of the converter, the coils pertaining to one phase can be serially and/or parallelly connected to different poles.

The reactance which counteracts the commutating can be reduced by providing a damping cake. This reduces the commutation-reactance to the leakage to the damper winding. The damper winding also acts as a compensating winding for the balancing or equalizing of transients in the ampere-turns distribution.

The above-described arrangement allows a commutatorless machine and a converter to be operated with but one control reference value, including the weakening of the field, in a fully continuous manner, and automatically in every mode of operation arising from the combination of right-hand and left-hand rotation, and motor and braking action, including starting and delivering the torque needed when the motor is standing still.

If the arrangement shown in FIGURES 1 and 2 is included in smaller motors having a smaller number of phases, particularly two-phase motors, there will be obtained larger torque fluctuations as a function of angle of rotation. For reducing or even eliminating the same, a reference current value is provided which has an approximately sinusoidal configuration with respect to the position of the revolving field and/or time instead of the rectangular mode of operation described above. This can be done by varying the current reference value continuously as a function of the position of the revolving field. This can be done by using a multiplier, such as a Hall multiplier or other type of analogue multiplier. This multiplier takes the place of the polarity reverser 2, as described before. One of the input magnitudes of the multiplier is still the limited output value obtained from the overall control, for example speed control amplifier 1, the second input magnitude being the signal coming from the sensing device 3 which is now a continuously varying signal. As a result, the current reference value will be such that it is periodic if the rotation is even with respect to time and position of the revolving field, the shape of the current reference value corresponding to the signal coming from the scanning device 3, and the amplitude being determined by the signal coming from the regulator 1.

The last-mentioned features can also be used to advantage if there are more than two phases.

It will be understood that the above description of the present invention is susceptible to various modifications, changes, and adaptations, and the same are intended to be comprehended within the meaning and range of equivalents of the appended claims.

Publications concerning static converters:

(1) A. Jötten: Stand der Entwicklung auf dem Gebiet der Stromrichter für Antriebe. VDE-Fachberichte 1960 (Volume 21, part I, pages 70–82, especially pages 77, 79 and FIGURES 24, 25, 29, 30).

(2) C. Kessler: Transistoren in der Antriebstechnik. Volume 4 of VDE-Buchreihe, "Steuerungen und Regelungen elektrischer Antriebe." VDE-Verlag, Berlin, 1959. Editor: O. Mohr.

(3) M. Meyer: Neuere Erkenntnisse über den Stromrichter in Gegenparallelschaltung. VDE-Fachberichte 1960 (Volume 21, part I, pages 63–66, with appendix by M. Depenbrock, pages 67–69).

What is claimed is:

1. In a control system for a converter-fed multiphase motor of the synchronous motor type which has respective phase coils and pole gaps and in which there is a revolving field and in which each phase is supplied with current independently of the other phases through a static converter arrangement capable of carrying current in both directions and of operating as a rectifier or inverter by ignition angle control, the combination which comprises:
    (a) means for varying the ignition angle in respect of each phase converter in dependence on a comparison between a current reference value and the actual current carried by the phase converter; and
    (b) means for changing the sign of the current reference value when the corresponding phase coil is in the region of a pole gap.

2. The combination defined in claim 1 wherein said means (b) include a polarity reverser and a scanning device connected to said polarity reverser and responsive to the position of the revolving field of the machine.

3. The combination defined in claim 2 wherein the revolving field is represented by a three-value raster, and wherein said scanning device photo-electrically scans said raster for producing a polarity reversal pulse when the coil side enters the pole gap.

4. The combination defined in claim 2 wherein said means (b) further include a reduced-size replica of the revolving field and wherein said scanning device includes a Hall-type transducer for scanning said replica.

5. The combination defined in claim 2 wherein said means (b) include a reduced-size replica of the revolving field, said replica having pole gaps which are enlarged with respect to relations in the actual revolving field.

6. The combination defined in claim 2 wherein said scanning device includes magnetic field-responsive feeler means arranged in the inductor of the machine, said feeler means responding to the polarity of the magnetic field to which the corresponding coil side is exposed.

7. The combination defined in claim 6, further comprising means for transforming the output of said feeler means, which is a signal proportional to the induction, into a signal which contains, as an additive component, the differential of the magnetic flux density with respect to time.

8. The combination defined in claim 6 wherein said means (b) further comprise a bistable flip-flop circuit connected ahead of said polarity reverser, which flip-flop circuit responds only to signals of a given polarity, the polarized signal which triggers said flip-flop circuit being derived primarily from changes, with respect to time, of the signal delivered by said feeler means.

9. The combination defined in claim 1, further comprising means for automatically weakening the field as a function of armature voltage.

10. The combination defined in claim 6 wherein the measured value of the voltage proportional to the maximum magnetic flux density is, upon weakening of the field, maintained approximately constant by increasing the control current of a Hall-type transducer inversely proportional to the magnetic flux of the machine.

11. The combination defined in claim 1, further comprising means for supplying a current reference value which is approximately sinusoidal relative to at least one of the following: the position of the revolving field, and time.

12. The combination defined in claim 11 wherein the static converter arrangement comprises a current regulator, and wherein said means (b) include a continuous polarity reverser, said continuous polarity reverser being a multiplier into which are fed as factors the approximately sinusoidal signal of the scanning device and the limited output of the speed regulator or other superimposed regulator so that the product thus produced in said multiplier represents the reference value effective at said current regulator.

13. The combination defined in claim 11 wherein, in the case of smaller size machines, there are but two phases.

References Cited by the Examiner

UNITED STATES PATENTS

| | | | |
|---|---|---|---|
| 2,644,916 | 7/1953 | Alexanderson et al. | 318—138 |
| 2,995,690 | 8/1960 | Lemond | 318—138 |
| 2,995,694 | 8/1961 | Sorkin | 318—448 |
| 3,023,348 | 2/1962 | Cox | 318—138 |
| 3,050,671 | 8/1962 | Moller | 318—171 |

ORIS L. RADER, *Primary Examiner.*

JOHN F. COUCH, *Examiner.*

C. E. ROHRER, G. Z. RUBINSON, *Assistant Examiners.*